(12) United States Patent  
Boe

(10) Patent No.: US 6,292,359 B1
(45) Date of Patent: Sep. 18, 2001

(54) COMPONENT MOUNT

(75) Inventor: Craig L. Boe, Nampa, ID (US)

(73) Assignee: Micron Electronics, Inc., Nampa, ID (US)

( * ) Notice: Subject to any disclaimer, the term of this patent is extended or adjusted under 35 U.S.C. 154(b) by 0 days.

(21) Appl. No.: 09/307,739

(22) Filed: May 10, 1999

(51) Int. Cl.[7] .............................. H05K 5/00; H05K 7/00; H05K 5/02
(52) U.S. Cl. .......................... 361/685; 361/683; 361/686; 361/725; 312/333; 360/98.01
(58) Field of Search ..................... 361/680, 683, 361/685, 724–727, 686, 818; 364/708.1, 131; 312/32.1, 333; 439/66, 152, 153, 157–160; 369/34, 36, 39, 75.1, 77.1; 360/98.01, 98, 97, 86

(56) References Cited

U.S. PATENT DOCUMENTS

| | | | |
|---|---|---|---|
| 4,941,841 | * | 7/1990 | Darden et al. ........................ 439/377 |
| 4,964,017 | * | 10/1990 | Jindrick et al. ...................... 361/390 |
| 5,041,924 | * | 8/1991 | Blackborow et al. ................. 360/69 |
| 5,211,459 | * | 5/1993 | Wu ..................................... 312/223.2 |
| 5,340,340 | * | 8/1994 | Hastings et al. ....................... 439/64 |
| 5,886,869 | * | 3/1999 | Fussell et al. ........................ 361/685 |
| 5,975,735 | * | 11/1999 | Schmitt ............................... 364/131 |
| 6,025,987 | * | 2/2000 | Allirot et al. ......................... 361/685 |
| 6,088,222 | * | 7/2000 | Schmitt et al. ....................... 361/686 |

* cited by examiner

Primary Examiner—Leo P. Picard
Assistant Examiner—Anatoly Vortman
(74) Attorney, Agent, or Firm—Perkins Coie LLP

(57) ABSTRACT

A mount for a computer component such as a disk drive includes horizontal platforms having upstanding studs and a strap. The strap is movable between an open position in which a drive may be removed from or installed into the mount and a closed position in which the upstanding studs are inserted into bores in the component and the strap keeps the component in place such that the studs remain in the bore and the drive is secure. Each end of the strap travels in a vertical channel formed along a corresponding vertical wall of the mount. Each end of the strap is provided with a detent and each vertical channel includes a detent receptacle sized to engage the detent. The detent receptacle corresponds to a closed position. A second detent receptacle may also be provided to hold the strap in an open position. The detent reliably secures the drive in the closed position while allowing the strap to be moved easily between the open and closed positions. In a preferred embodiment, the mount and strap are formed of sheet metal which is folded and punched. Preferably, the mount fits into a standard 5¼" drive bay and accepts 3½" components.

45 Claims, 5 Drawing Sheets

COMPONENT MOUNT

BACKGROUND OF THE INVENTION

1. Field of the Invention

The present invention is relates generally to the field of computer manufacturing and more particularly to a mount for computer components.

2. Description of the Related Art

As computers have become a commodity, computer manufacturers have been faced with increasing competition. One result of this competition is that computer manufacturers have sought to decrease the time required to assemble a computer. Many computer components, such as floppy and hard disk drives, are supplied with threaded bores at standard locations and standard sizes so that the components may be secured into a computer mount with threaded machine screws during assembly. For example, the disk drive 10 of FIG. 1, shown upside-down, includes four threaded bores 15 at standard positions along its bottom surface 16. Also shown in FIG. 1 for the sake of completeness are power connectors 11, 12 and a data connector 13 on the rear vertical surface 14 of the drive 10.

Installing computer components with threaded machine screws in the bores 15 is time consuming, and therefore costly, because the computer components must be carefully handled during assembly and because care must be taken to ensure that the machine screws are installed correctly (e.g. not cross-threaded or over-tightened). Computer manufacturers have therefore sought to find alternatives to threaded machine screws for securing components to a computer chassis.

One alternative to using machine screws to secure a component such as a disk drive to a computer mount is to include special mounting tabs on the disk drive for securing the disk drive to a computer frame. However, there is no industry-recognized standard except for the threaded holes discussed above. Therefore, a computer manufacturer must make special provisions with a disk drive manufacturer in order to have special mounting tabs supplied with the drive. Unfortunately, such a special requirement will increase the cost of the drive, which makes this option unacceptable to many computer manufacturers. Additionally, purchasers of the computer may not be able to obtain replacements for failed components with such special tabs, which may make computers with such special tabs less desirable.

FIG. 2 illustrates one prior art solution to this problem in the form of a disk drive mount 100. The mount 100, which is sized to fit a standard 5¼" disk drive bay of a personal computer, is designed to accept a standard 5¼" floppy disk drive 10 (shown in phantom in FIG. 2) and secure it to a computer frame without the need for machine screws or special tabs. As used herein, 5¼" and 3½" refer not to the actual width of the disk drive, but rather refer to standard widths and heights of floppy disk drives that accept 5¼" and 3½" floppy disks, respectively. The mount 100 may be used with both hard and floppy 3½" disk drives. The mount 100 is itself secured to a computer frame, or chassis (not shown in FIG. 2), in any manner known in the art, such as with sheet metal screws.

The mount 100 has two substantially parallel vertical walls 110 which are spaced approximately 3½" apart to accept the disk drive 10. Each vertical wall 110 has two horizontal platforms 112 protruding therefrom toward the center of the mount 100. The horizontal platforms 112 are at the same height on the wall 110 and are positioned at a horizontal distance along the wall 110 to coincide with the location of standard threaded bores 15. An upstanding stud 114 protrudes from the upper surface of each horizontal platform 112. The maximum thickness of the upstanding stud 114 is slightly less than the inner diameter of the threaded bore 15 so that the upstanding stud 114 may be inserted easily into the threaded 15 bore.

When the disk drive 10 is placed into the mount 100 as shown in FIG. 2, each of the threaded bores 15 are aligned with an upstanding stud 114 and the upstanding studs 15 protrude into the threaded bores 15. The disk drive bottom surface 16 is in contact with and provides support to the horizontal platforms 112 of the mount 100. In this manner, the horizontal platforms 112 provide vertical support for the disk drive 10 and the upstanding studs 114 prevent horizontal translation of the drive 10.

The upstanding studs 114 do not fixedly engage with the threaded bores 15, but are merely inserted therein. Accordingly, it is necessary to vertically secure the drive 10 in the mount 100. This is accomplished by the two spring clips 120. The spring clips 120 exert a downward force on the drive 10 and urge the drive 10 into contact with the horizontal platforms 112. The spring clips 120 are deformable such that they may be moved upward and outward into an "open" position when the drive 10 is being installed in or removed from the mount 100.

The mount 100 is effective in securing a drive 10 to a computer chassis without the use of machine screws or special tabs on the drive 10. However, some problems with the mount 100 have been encountered. Chief among these is the amount of force that is required to move the spring clips 120 into an open position. Factory personnel have complained that the required force is too great and that fatigue results when many drives are installed. Another concern is that purchasers of computers with a mount 100 may damage a drive or be unable to remove a drive because of the amount of force required to move the spring clips 120 into an open position.

What is needed is a mount into which a standard disk drive may be easily and reliably installed without repeatability fatigue and without the use of machine screws.

SUMMARY OF THE INVENTION

The present invention provides a component mount with horizontal platforms having upstanding studs and a strap. The strap is movable between an open position in which a component may be removed from or installed into the mount and a closed position in which the strap prevents the component in place with the studs inserted in bores provided in the component so that the component is secure. Each end of the strap travels in a vertical channel formed along a corresponding vertical wall of the mount. A detent is provided at each end of the strap. Each vertical channel includes a detent receptacle sized to engage the detent when the strap is in a closed position. A second detent receptacle may also be provided to engage the detent to hold the strap in an open position. The detent reliably secures the strap while allowing the strap to be moved easily between the open and closed positions. In a preferred embodiment, the mount and strap are formed of sheet metal which is folded and punched. Preferably, the mount fits into a standard 5¼" drive bay and accepts 3½" drives. However, other embodiments, including a mount for a 5¼" device such as a CD-ROM drive, are also possible.

BRIEF DESCRIPTION OF THE DRAWING

The foregoing and other advantages and features of the invention will become more apparent from the detailed description of the preferred embodiments of the invention given below with reference to the accompanying drawing in which.

DETAILED DESCRIPTION OF THE PREFERRED EMBODIMENTS

Figure 1:
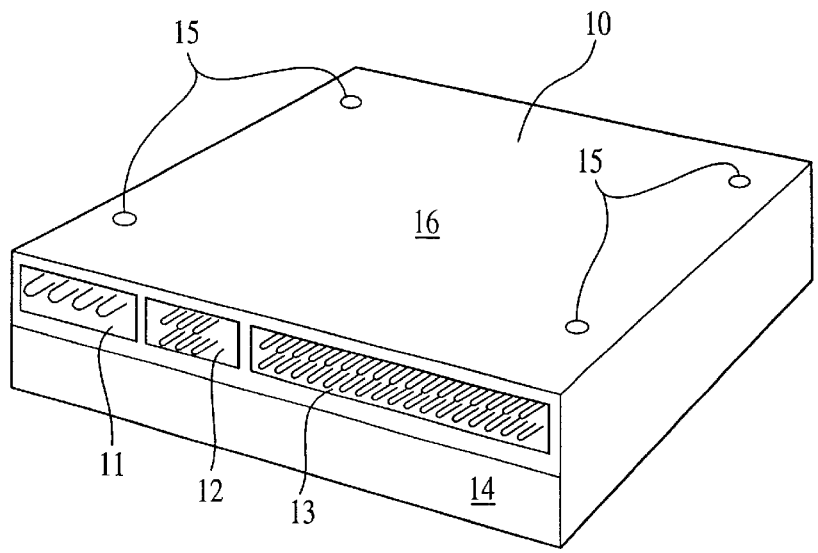
FIG. 1 is a perspective view of a disk drive.
Figure 2:
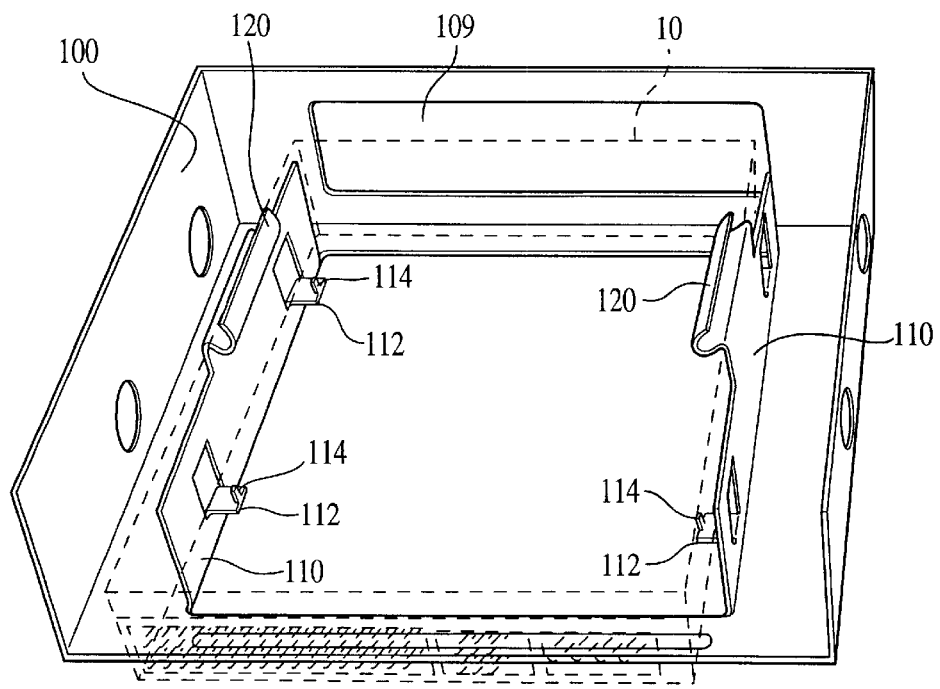
FIG. 2 is a perspective view of a prior art disk drive mount with the disk drive of FIG. 1 installed therein.

The present invention will be illustrated through a description of a disk drive mount. Numerous specific details, such as dimensions, are set forth in order to provide a thorough understanding of the present invention. It will be obvious, however, to one skilled in the art that the present invention is capable of many different embodiments and that the present invention may be practiced without the specific details set forth herein. Accordingly, the drawing and description herein are to be regarded as illustrative in nature and not as restrictive.

Figure 3:
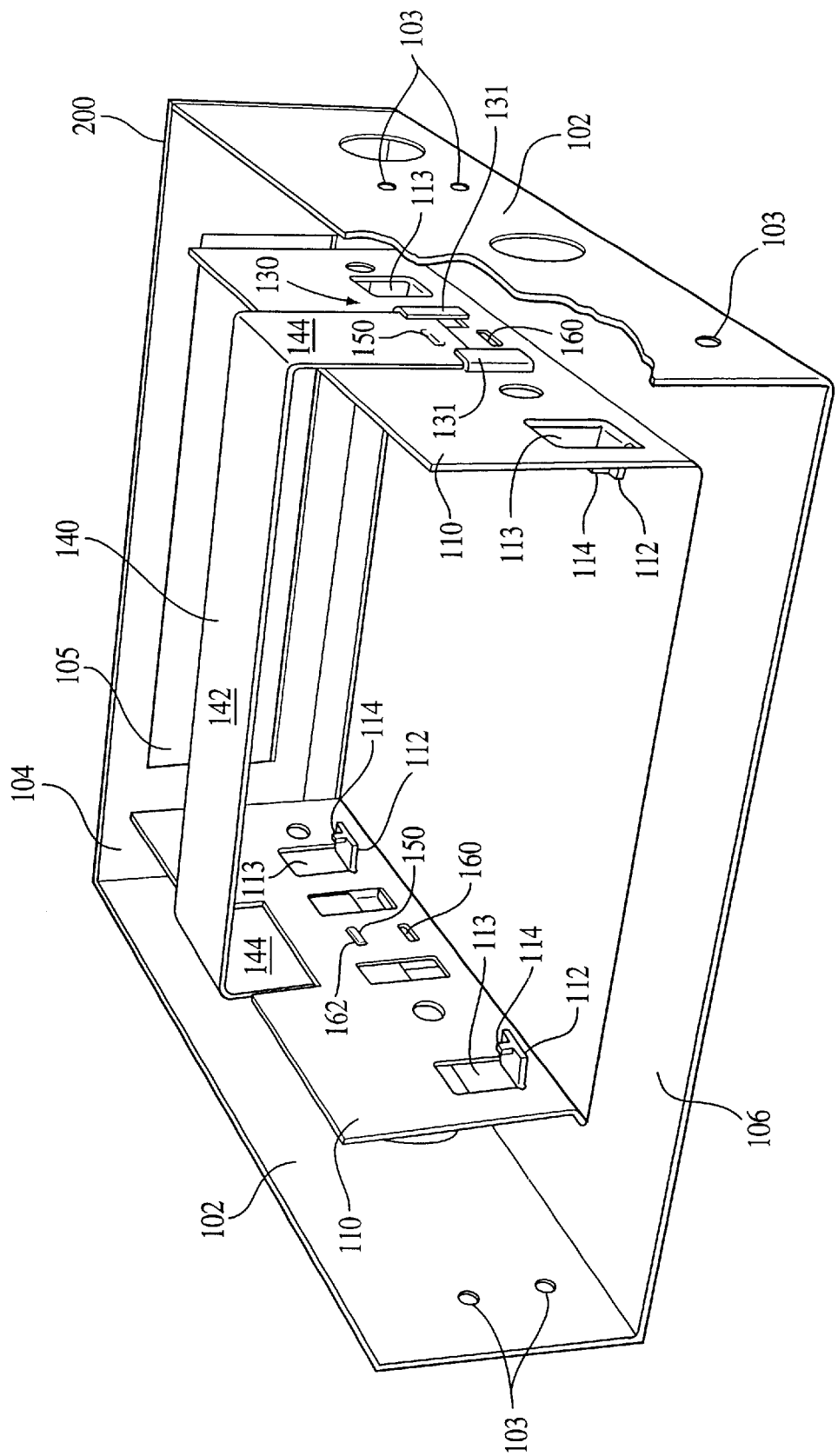
FIG. 3 is a perspective view of a disk drive mount according to one embodiment of the present invention.

A mount 200 according to one embodiment of the present invention is illustrated in FIG. 3. The mount 200 includes two sidewalls 102, a front wall 104 and a bottom 106 that are sized such that the mount 200 may be inserted into a standard 5¼" drive bay of a personal computer. The front wall 104 includes an opening 105 that allows access to the front faceplate of a standard 3½" floppy drive should such a drive be installed in the mount 200. The sidewalls 102 include bores 103, which may or may not be threaded, for securing the mount to a computer chassis (not shown in FIG. 3). The bottom surface also may include threaded bores for this purpose.

The mount 200 also includes two substantially parallel interior vertical walls 110 which are spaced apart to accept a standard 3½" disk drive. Each of the vertical walls 110 includes two horizontal platforms 112. Each of the horizontal platforms 112 includes an upstanding stud 114. The horizontal platforms 112 and the upstanding studs 114 are positioned and perform functions similar to those performed in the prior art mount 100 of FIG. 1.

The mount 200 also includes a strap 140 that secures a disk drive in the mount 200. The strap 140 comprises a horizontal strap portion 142 and two vertical strap portions 144. Each of the vertical strap portions 144 are inserted into a channel 130 formed by two channel flaps 131. The channel flaps 131, which are formed by partially separating and shaping portions of the vertical wall 110, allow vertical movement of the vertical strap portions 144 while preventing horizontal movement. Each of the vertical strap portions 142 also includes a detent 150 which is sized and positioned to be engageable by either a lower detent receptacle in the form of a cutout 160 or an upper detent receptacle in the form of a cutout 162 in the channel 130. The upper detent receptacle 162 is provided for the sake of convenience so that the strap 140 will remain in an open position while a component is being installed in the mount; accordingly, the upper detent receptacle 162 may be eliminated and the strap 140 simply held in an open position during the installation of a component. The space between each channel flap 131 of a channel 130 is sufficient to allow the vertical strap portions to be outwardly deformed (with respect to the interior of the mount 200) such that the detent 150 is disengaged from the cutout 160, 162. The strap 140 should be of a material and thickness such that the force required to disengage the detent 150 from the cutout 160, 162 is easily applied by an average adult, such as a force of approximately 10 pounds or less.

Figure 4:
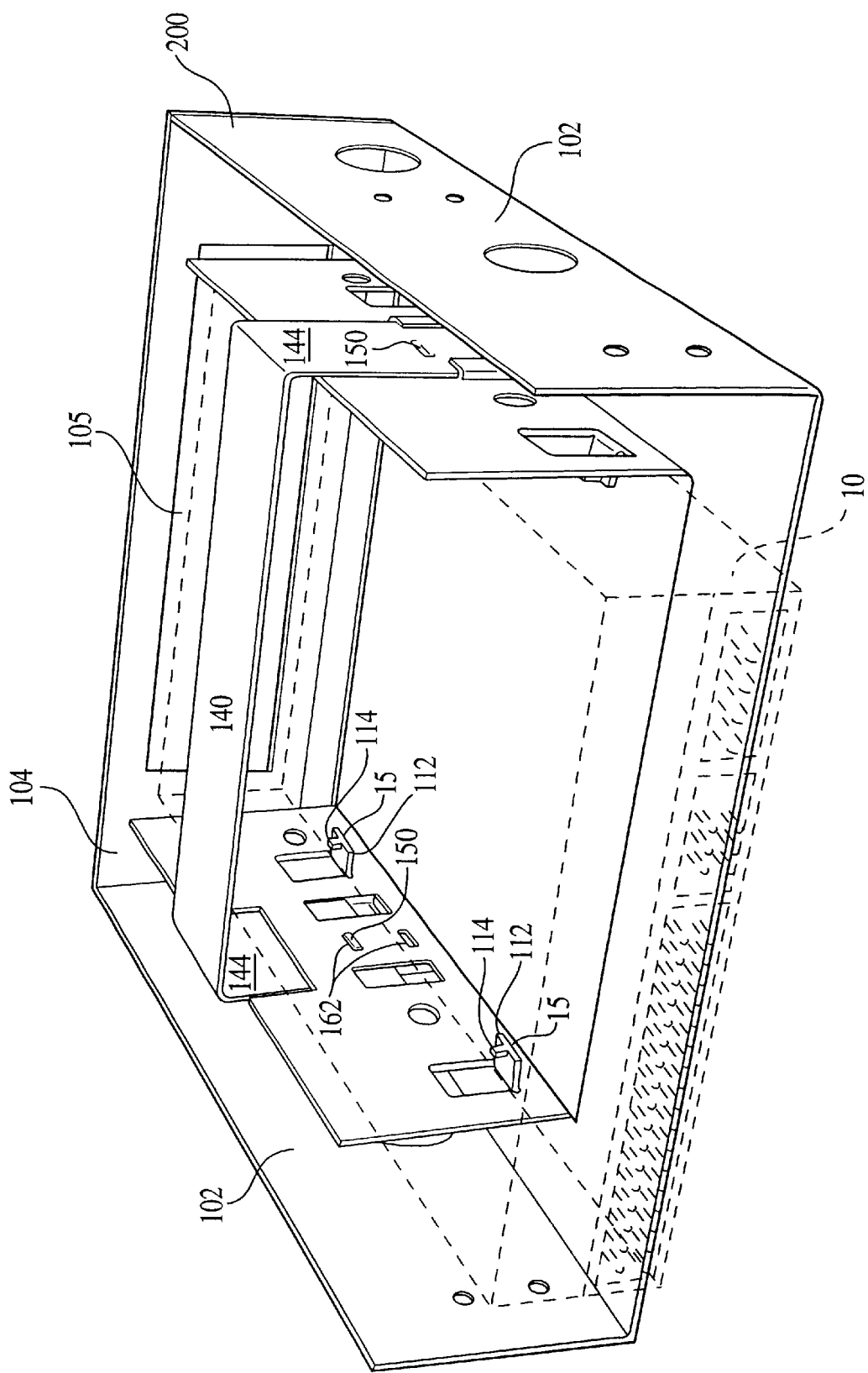
FIG. 4 is a view like FIG. 3 of a mount in an open position with a disk drive installed.
Figure 5:
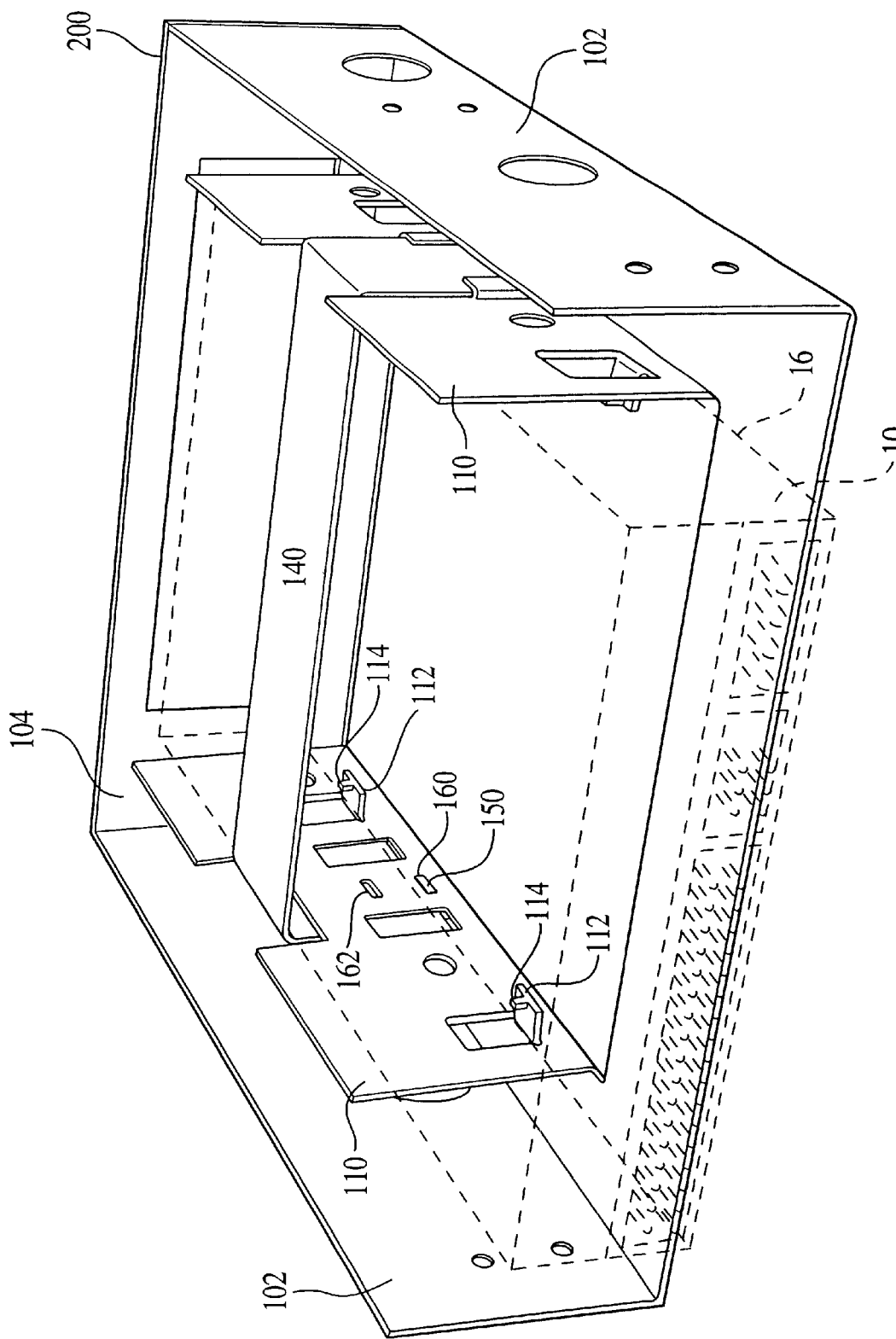
FIG. 5 is a view like FIG. 3 of a mount in a closed position with a disk drive installed.

When the vertical strap portions 144 are positioned such that the detent 150 is positioned in the upper cutout 162, the horizontal strap portion 142 is at a height sufficient to allow the insertion of a disk drive 10 as shown in FIG. 4. To install the disk drive 10, the disk drive 10 is positioned so that the upstanding studs 114 are inserted into the threaded bores 15 of the disk drive 10. The drive 10 is supported vertically by the horizontal platforms 112. The strap 140 is then pushed down with a force sufficient to disengage the detent 150 from the upper cutout 162. The strap 140 is pushed down until the detent 150 engages the lower cutout 160, as shown in FIG. 5. In this position, the strap 140 prevents the drive 10 from moving upward and becoming disengaged from the upstanding studs 114.

The lower cutouts 160 are positioned such that they are below the bottom surface 16 of the drive 10. This is done so that the cutouts 160 are accessible when the drive 10 is installed in the mount 200. This allows a user to insert an object such as a small screwdriver into the cutout 162 to force the detent 150 out of the cutout 162 and thereby permit easy upward movement of the strap 140 for removal of a drive 10.

Figure 6:
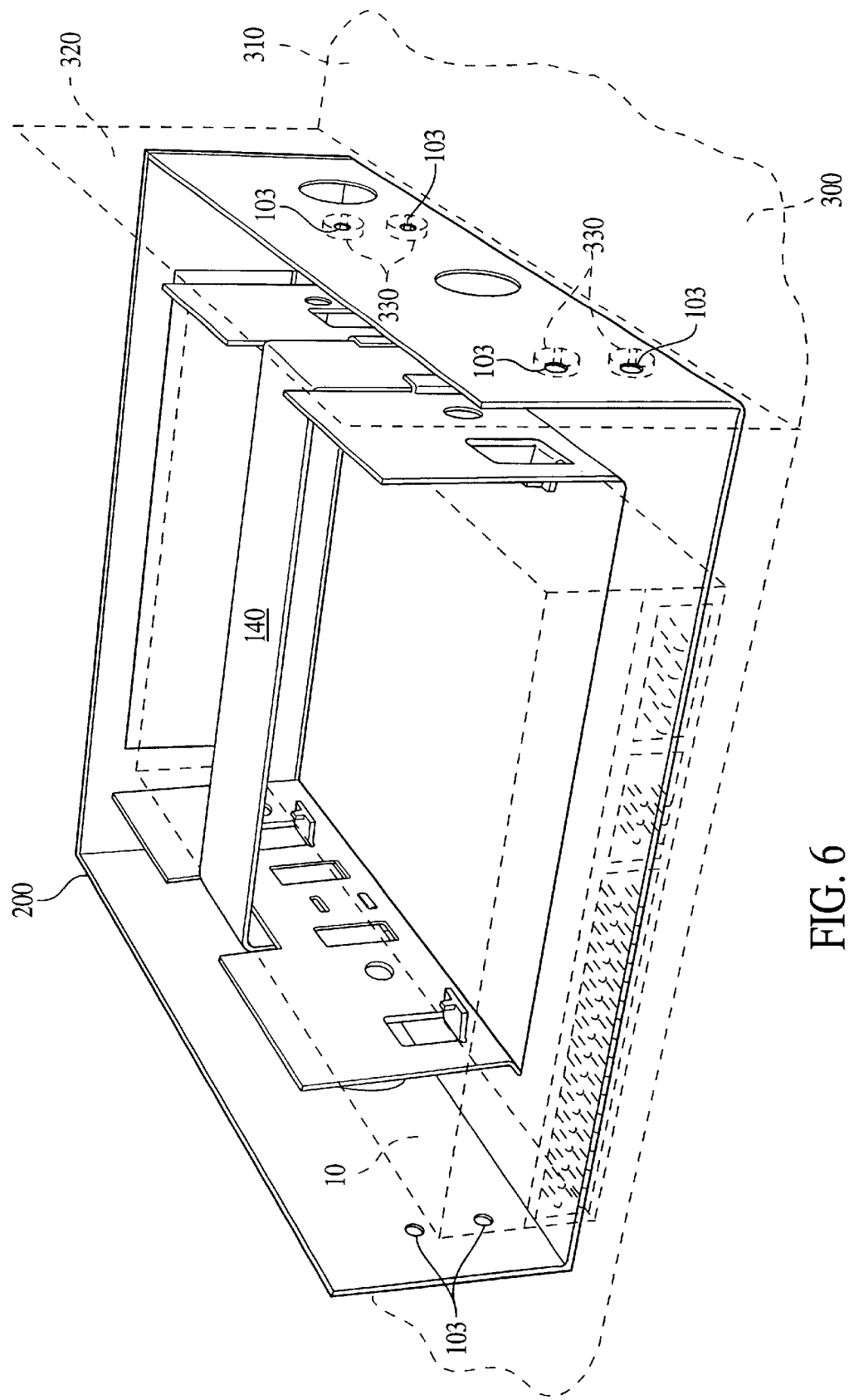
FIG. 6 is a perspective view of a mount connected to a computer chassis.

FIG. 6 shows the mount 200 connected to a portion of a computer chassis 300. The chassis 300 includes a horizontal surface 310 and a wall 320. The mount is secured to the wall 320 by screws 330 inserted through the wall 320 and into threaded bores 103 in the mount 200. It will be obvious to those of skill in the art that the frame 200 could be secured to the chassis 300 in any number of ways, including screwing the frame 200 to the chassis bottom surface 310 with sheet metal screws. Other surfaces of the chassis 300 and/or frame 200 may be selected as the surfaces by which the frame 200 is secured to the chassis 300. Furthermore, clamps or other devices, rather than sheet metal screws, could also be used to secure the mount 200.

In the embodiment of the mount 200 described above, the detent 150 is engaged by detent receptacles in the form of cutouts 160, 162. However, it is not necessary that the detent receptacles be formed by actual holes in the vertical walls 110; a depression, rather than a cutout, will also suffice. Of course, in such an embodiment, it will not be possible to push the detents 150 out of the depressions in the manner that the detents 150 may be pushed out of the cutouts 160, 162 as described above. Rather, it will be necessary to deform the vertical strap portions in some other manner, such as inserting a screwdriver under the some portion of the strap 140 and prying.

In the embodiment described above, the mount 200 (including the strap 140 and the upstanding studs 114) is formed of sheet metal which is folded, bent and punched into its final form. The sheet metal used in the preferred embodiment is steel. However, it is not necessary to use sheet metal. Other materials, such as plastics, could also be used. Furthermore, the material may be formed in a mold rather than fabricated from a sheet.

The mount 200 is sized to accept a 3½" drive. However, such a mount may be used with 5¼" and other sized drives as well. Also, the mount 200 is sized to fit a standard 5¼"

drive bay, but other sizes are also possible. Furthermore, the mount need not include the outer surfaces 102, 104, 106. Rather, the mount may consist of only vertical walls 110 and the strap 140 (along with the corresponding channel 130, platforms 112 and upstanding studs 114). In such an embodiment, the vertical walls 110 are attached to a computer chassis or form part of the chassis.

In the above discussions, the device secured by the mount 200 was a disk drive. Many different types of drives, such as floppy disk drives, hard disk drives, optical disk drives (e.g. CD-ROM, CD-R, etc.), etc. may be secured by the mount 200. Components other than drives may also be secured.

A mount for securing a component such as a disk drive has been shown. The mount includes a strap which is movable into an open or closed position. The mount quickly and reliably secures the component without the use of machine screws. In a preferred embodiment, the mount is fabricated from sheet metal.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A mount for securing a component to a frame, said mount comprising:
    a strap having a horizontal portion and first and second vertical ends, each of the vertical strap ends having a first engaging element formed therein; and
    a pair of opposed vertical walls, each of the vertical walls having at least one substantially horizontal platform with at least one upstanding stud projecting therefrom, each stud being positioned such that it may be inserted into a corresponding bore in the component when the component is placed in the mount, each of the vertical walls defining a channel sized to accept a vertical strap end; each channel having a second engaging element formed therein for engaging the first engaging element when the strap is in a closed position and a third engaging element formed therein for engaging the first engaging element when the strap is in an open position, the strap being movable between an open position in which the component may be placed in the mount and the closed position in which the component is secured in the mount.

2. The mount of claim 1, wherein the first engaging element comprises a detent and the second engaging element comprises a first detent receptacle.

3. The mount of claim 2, wherein the third engaging element comprises a second detent receptacle.

4. The mount of claim 3, wherein the first and second detent receptacles comprise a hole in the vertical wall.

5. The mount of claim 4, wherein the hole is formed by cutting away a portion of the vertical wall.

6. The mount of claim 3, wherein the first and second detent receptacles comprise depressions formed in the vertical wall.

7. The mount of claim 1, wherein the channel is formed by a pair of flaps.

8. The mount of claim 7, wherein the flaps are formed by partially separating and shaping a portion of the vertical wall.

9. The mount of claim 3, wherein the second detent receptacle is located below a bottom surface of the component when the component is secured by the mount.

10. The mount of claim 1, wherein the vertical walls are substantially parallel.

11. The mount of claim 1, wherein the vertical walls are spaced apart by a distance sufficient for a standard three and one half inch floppy disk drive to be inserted in the mount.

12. The mount of claim 1, further comprising a front wall, two sidewalls and a bottom surface, the two sidewalls being spaced apart at a distance farther than the distance by which the vertical walls are spaced apart, the sidewalls and vertical walls being connected to the bottom surface such that the vertical walls are between the sidewalls, the front wall being connected to the bottom surface and positioned such that an end of the front wall is substantially adjacent to an end of each of the sidewalls.

13. The mount of claim 12, wherein the front wall has an opening therein for providing access to the component.

14. The mount of claim 12, wherein the sidewalls are substantially parallel.

15. The mount of claim 14, wherein the sidewalls are spaced apart by a distance approximately equal to a width of an opening of a standard five and one quarter inch drive bay.

16. The mount of claim 1, wherein the strap is formed of sheet metal.

17. The mount of claim 16, wherein the metal is steel.

18. A method of securing a component in a mount having vertical walls, comprising the steps of:
    providing a mount strap in an open position wherein first engaging elements formed in the strap are engaged by third engaging elements formed in the vertical walls of the mount;
    placing a component in the mount such that upstanding studs protruding from horizontal platforms on the vertical walls of the mount are inserted into mounting holes on the bottom surface of the component;
    moving the mount strap into a closed position such that the first engaging elements are engaged by second engaging elements formed in the vertical walls.

19. The method of claim 18, wherein the step of providing a mount strap in an open position is performed by providing the mount strap with the first engaging elements are positioned below the third engaging elements and moving the mount strap upward until the first engaging elements are engaged by the third engaging elements.

20. A computer comprising:
    a chassis;
    at least one mount connectable to the chassis; and
    at least one component securable in the mount;
    wherein the mount comprises
    a strap having a horizontal portion and first and second vertical ends, each of the vertical strap ends having a first engaging element formed therein; and
    a pair of opposed vertical walls, each of the vertical walls having at least one substantially horizontal platform with at least one upstanding stud projecting therefrom, each stud being positioned such that it may be inserted into a corresponding bore in the component when the component is placed in the mount, each of the vertical walls defining a channel sized to accept a vertical strap end; each channel having a second engaging element formed therein for engaging the first engaging element when the strap is in a closed position and a third engaging element formed therein for engaging the first engaging element when the strap is in an open position, the strap being movable between an open position in which the component may be placed in the mount and the closed position in which the component is secured in the mount.

21. The mount of claim 20, wherein the first engaging element comprises a detent and the second engaging element comprises a first detent receptacle.

22. The computer of claim 21, wherein the third engaging element comprises a second detent receptacle.

23. The computer of claim 21, wherein the first detent receptacle comprises a hole in the vertical wall.

24. The computer of claim 23, wherein the hole is formed by cutting away a portion of the vertical wall.

25. The computer of claim 21, wherein the first detent receptacle comprises a depression formed in the vertical wall.

26. The computer of claim 20, wherein the channel is formed by a pair of flaps.

27. The computer of claim 26, wherein the flaps are formed by partially separating and shaping a portion of the vertical wall.

28. The computer of claim 22, wherein the second detent receptacle is located below a bottom surface of the component when the component is secured by the mount.

29. The computer of claim 20, wherein the vertical walls are substantially parallel.

30. The computer of claim 20, wherein the vertical walls are spaced apart by a distance sufficient for a standard three and one half inch floppy disk drive to be inserted in the mount.

31. The computer of claim 20, further comprising a front wall, two sidewalls and a bottom surface, the two sidewalls being spaced apart at a distance farther than the distance by which the vertical walls are spaced apart, the sidewalls and vertical walls being connected to the bottom surface such that the vertical walls are between the sidewalls, the front wall being connected to the bottom surface and positioned such that an end of the front wall is substantially adjacent to an end of each of the sidewalls.

32. The computer of claim 31, wherein the front wall has an opening therein for providing access to the component.

33. The computer of claim 31, wherein the sidewalls are substantially parallel.

34. The computer of claim 33, wherein the sidewalls are spaced apart by a distance approximately equal to a width of an opening of a standard five and one quarter inch drive bay.

35. The computer of claim 20, wherein the strap is formed of sheet metal.

36. The computer of claim 35, wherein the metal is steel.

37. The computer of claim 20, wherein the component is a disk drive.

38. The computer of claim 37, wherein the disk drive is a floppy disk drive.

39. The computer of claim 37, wherein the disk drive is a hard disk drive.

40. A method of assembling a computer comprising the steps of:
   connecting a mount to a computer chassis, the mount comprising
   a strap having a horizontal portion and first and second vertical ends, each of the vertical strap ends having a first engaging element formed therein; and
   a pair of opposed vertical walls, each of the vertical walls having at least one substantially horizontal platform with at least one upstanding stud projecting therefrom, each of the vertical walls defining a channel sized to accept a vertical strap end; each channel having a second engaging element formed therein for engaging the first engaging element when the strap is in a closed position and a third engaging element formed therein for engaging the first engaging element when the strap is in an open position;
   moving the mount strap into the open position such that the first engaging elements formed in the strap are engaged by the third engaging elements formed in the vertical walls;
   placing a component in the mount such that upstanding studs protruding from horizontal platforms on vertical walls of the mount are inserted into mounting bores on the bottom surface of the component;
   moving the mount strap into the closed position such that the first engaging elements formed in the strap are engaged by the second engaging elements formed in the vertical walls.

41. The method of claim 40, wherein the step of moving the mount strap into the open position is performed by moving the mount strap upward until the first engaging elements are engaged by the third engaging elements in the vertical walls.

42. The method of claim 40, wherein the connecting step is performed using sheet metal screws.

43. A mount for securing a component to a frame, said mount comprising:
   a strap having a horizontal portion and first and second vertical ends, each of the vertical strap ends having a detent formed therein; and
   a pair of opposed vertical walls, each of the vertical walls having at least one substantially horizontal platform with at least one upstanding stud projecting therefrom, each stud being positioned such that it may be inserted into a corresponding bore in lie component when the component is placed in the mount, each of the vertical walls defining a channel sized to accept a vertical strap end; each channel having a first detent receptacle formed therein for engaging the detent when the strap is in a closed position and a second detent receptacle formed therein for holding the strap in an open position, the strap being movable between the open position in which the component may be placed in the mount and the closed position in which the component is secured in the mount.

44. A computer comprising:
   a chassis;
   at least one mount connectable to the chassis; and
   at least one component securable in the mount;
   wherein the mount comprises
   a strap having a horizontal portion and first and second vertical ends, each of the vertical strap ends having a detent formed therein; and
   a pair of opposed vertical walls, each of the vertical walls having at least one substantially horizontal platform with at least one upstanding stud projecting therefrom, each stud being positioned such that it may be inserted into a corresponding bore in the component when the component is placed in the mount, each of the vertical walls defining a channel sized to accept a vertical strap end; each channel having a first detent receptacle formed therein for engaging the detent when the strap is in a closed position and a second detent receptacle formed therein for holding the strap in an open position, the strap being movable between the open position in which the component may be placed in the mount and the closed position in which t he component is secured in the mount.

45. A mount for securing a component to a frame, said mount comprising:

a strap having a horizontal portion and first and second vertical ends; and a pair of opposed vertical walls, each of the vertical walls having at least one substantially horizontal platform with at least one upstanding stud projecting therefrom, each stud being positioned such that it may be inserted into a corresponding bore in the component when the component is placed in the mount, each of the vertical walls defining a channel within which a vertical strap end is received, the channel restricting horizontal movement of the vertical strap end received therein;

each channel cooperating with the vertical strap end received therein to hold the strap in an open position in which the component may be placed in the mount, to hold the strap in a closed position in which the component is secured in the mount and to restrict horizontal movement of the vertical strap end as the strap is moved vertically between the open and closed positions.

* * * * *

UNITED STATES PATENT AND TRADEMARK OFFICE
CERTIFICATE OF CORRECTION

PATENT NO. : 6,292,359 B1
DATED : September 18, 2001
INVENTOR(S) : Boe

It is certified that error appears in the above-identified patent and that said Letters Patent is hereby corrected as shown below:

Column 8,
Line 38, "lie" should be -- the --;

Column 9,
Line 4, "th e" should be -- the --;

Signed and Sealed this

Twenty-first Day of January, 2003

JAMES E. ROGAN
*Director of the United States Patent and Trademark Office*